(12) United States Patent
Kurtz et al.

(10) Patent No.: US 9,939,598 B2
(45) Date of Patent: Apr. 10, 2018

(54) FIBER OPTIC CONNECTOR ASSEMBLY, APPARATUS FOR FORMING A TRANSCEIVER INTERFACE, AND FERRULE

(71) Applicant: US Conec, Ltd., Hickory, NC (US)

(72) Inventors: Daniel D. Kurtz, Huntersville, NC (US); Darrell R. Childers, Hickory, NC (US); Michael E. Hughes, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 15/001,037

(22) Filed: Jan. 19, 2016

(65) Prior Publication Data

US 2016/0209610 A1 Jul. 21, 2016

Related U.S. Application Data

(60) Provisional application No. 62/104,534, filed on Jan. 16, 2015.

(51) Int. Cl.
*G02B 6/42* (2006.01)
*G02B 6/38* (2006.01)

(52) U.S. Cl.
CPC .......... *G02B 6/4292* (2013.01); *G02B 6/3875* (2013.01); *G02B 6/3885* (2013.01); *G02B 6/4214* (2013.01); *G02B 6/4231* (2013.01)

(58) Field of Classification Search
CPC .................................... G02B 6/42; G02B 6/38

USPC ............................................................ 385/89
See application file for complete search history.

(56) References Cited

U.S. PATENT DOCUMENTS

| 7,287,914 B2 * | 10/2007 | Fujiwara | G02B 6/4214 385/52 |
| 8,936,403 B2 | 1/2015 | Howard et al. | |
| 8,985,865 B2 | 3/2015 | Howard et al. | |
| 2003/0113077 A1 * | 6/2003 | Xu | G02B 6/4204 385/93 |
| 2004/0126118 A1 * | 7/2004 | Lo | G02B 6/4206 398/139 |
| 2010/0135618 A1 * | 6/2010 | Howard | G02B 6/3829 385/79 |
| 2015/0131946 A1 | 5/2015 | Howard et al. | |

* cited by examiner

*Primary Examiner* — Kaveh C Kianni
(74) *Attorney, Agent, or Firm* — Michael L. Leetzow, P.A.

(57) ABSTRACT

An fiber-optic connector assembly includes a fiber optic ferrule and a connector, which engage an optical transceiver component. The fiber optic ferrule engages a mating plane of a lens array in the optical transceiver component and floats within the connector. The engagement of the assembly and the optical transceiver component may be removable rather than fixed. The fiber optic ferrule also engages a mechanical interface to account for three degrees of freedom, while the engagement of the mating surfaces account for another three degrees of freedom.

9 Claims, 18 Drawing Sheets

1

FIBER OPTIC CONNECTOR ASSEMBLY, APPARATUS FOR FORMING A TRANSCEIVER INTERFACE, AND FERRULE

REFERENCE TO RELATED CASE

This application claims priority under 35 U.S.C. § 119 (e) to provisional application No. 62/104,534 filed on Jan. 16, 2015, the contents of which are hereby incorporated by reference in their entirety.

BACKGROUND OF THE INVENTION

Field of the Invention

Typically when multi-fiber optic ferrules mate to optical transceivers, the multi-fiber ferrule mates to the optical transceiver at a mating plane. The mating plane of the optical transceiver normally contains guide holes or guide pins to align the multi-fiber ferrule in the x, y, and rotation in the x/y plane. The mating plane aligns the ferrule in the z distance and the rotation in the y/z and x/z planes. Both the multi-fiber ferrule and the optical transceiver contain one component each that control all 6 degrees of freedom together. This approach is common in multimode optical links.

Photonic-enabled silicon transceiver devices typically have an actively aligned interconnect that is produced from silicon, fused silica, or other similar material. This actively aligned interconnect, typically a v-grove lapped with optical fiber attached, is epoxied in place. This approach is taken to maximize coupling efficiency due to the small optical core size of the optical fibers and low coefficients of thermal expansion (CTE) associated with the silicon, fused silica, or other similar material. The permanent attachment of the components greatly limits the ability to test the connection and manufacturing flexibility of the passive and active components in the interconnect. It is desirable to have a separable interface at the photonically-enabled silicon chip for next generation optical links.

Thus, an apparatus for forming a transceiver interface that is able to align the components and account for all six degrees of freedom without the effect of different CTEs of the components causing misalignment during operation. It is also beneficial if the components are separable, meaning that they are intended to be separated from one another repeatedly without destroying any of the components or means of joining the components. It is also important that the optical ferrule floats relative to the connector in which it is disposed when the connector is attached to the transceiver devices.

SUMMARY OF THE INVENTION

The present invention is directed to an fiber optic connector assembly that includes a fiber optic ferrule which further includes a main body having a front end, a back end, and a first opening extending from the back end toward the front end, the first opening configured to receive optical fibers therein, and a bottom surface having a first portion and a second portion, the first portion having an optical aperture therein to allow light associated with the optical fibers to pass therethrough and the second portion having alignment projections extending from the bottom surface and away from the main body, and a connector to receive the fiber optic ferrule therein, the connector having a front end and a back end and an opening therebetween to receive the fiber optic ferrule therein, two latches on opposite sides of the opening between the front and back end and extending below the opening to engage a transceiver component.

In some embodiments, each of the latches has a receptacle to receive a portion of the fiber optic ferrule therein.

In some embodiments, the receptacle in each of the latches is a groove to receive an elongated shoulder of the fiber optic ferrule therein.

In other embodiments, the receptacle in each of the latches is a depression to receive a generally cylindrical extension of the fiber optic ferrule therein.

In some embodiments, the assembly also includes an elastic element disposed between a top surface of the fiber optic ferrule and the connector, the elastic element biasing the fiber optic ferrule in a downward direction.

According to another aspect of the present invention, there is a connector for securing a fiber optic ferrule to an optical transceiver component that includes a main body extending between a front end and a back end, two laterally extending portions extending away from one another and the main body, a pair of latches extending downward from the laterally extending portions on opposite sides of the main body, the distal ends of the latches having an upward facing surface, a pair of tabs aligned with a respective one of the pair of latches, the tabs extending upward from the laterally extending portions and away from the latches, and an opening in the connector for receiving the fiber optic ferrule, the opening defined at least in portion by the main body and the pair of latches.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
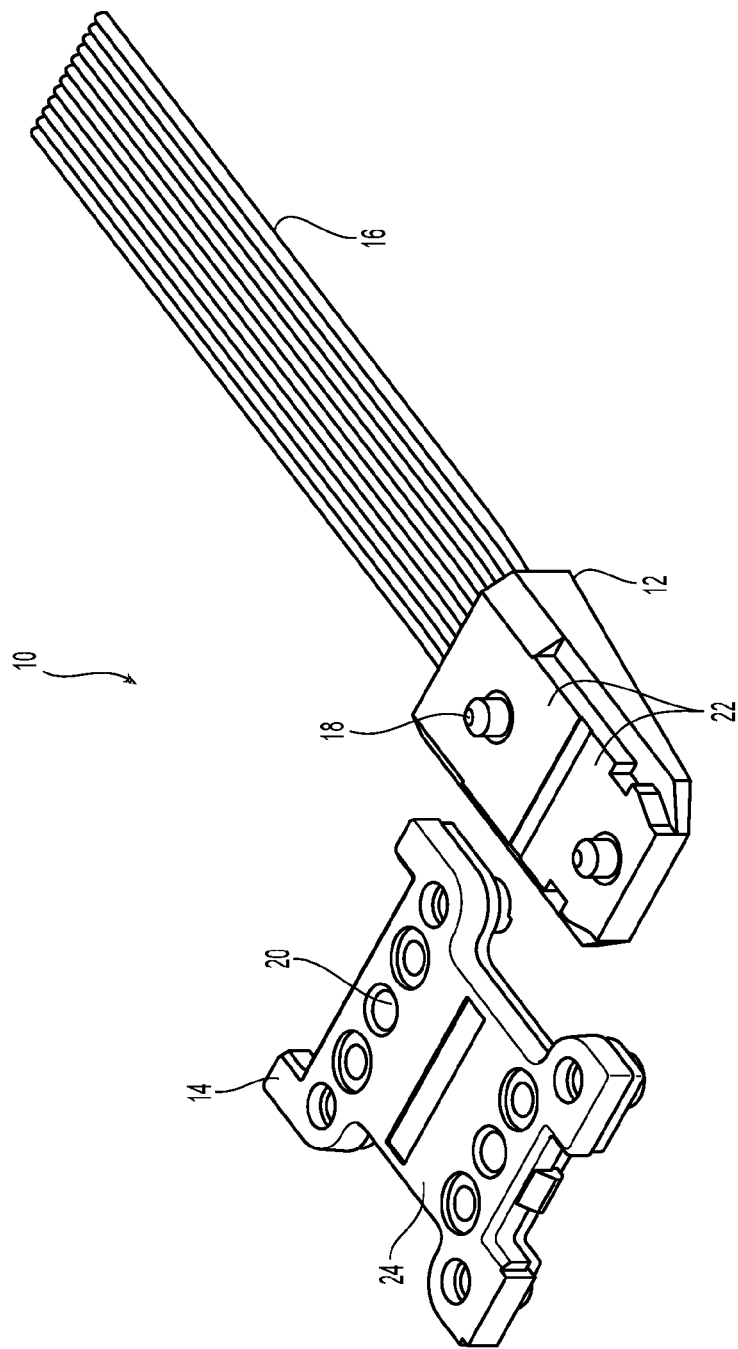
FIG. 1 is an exploded view of a prior art fiber optic ferrule and optical transceiver component showing mating surfaces.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
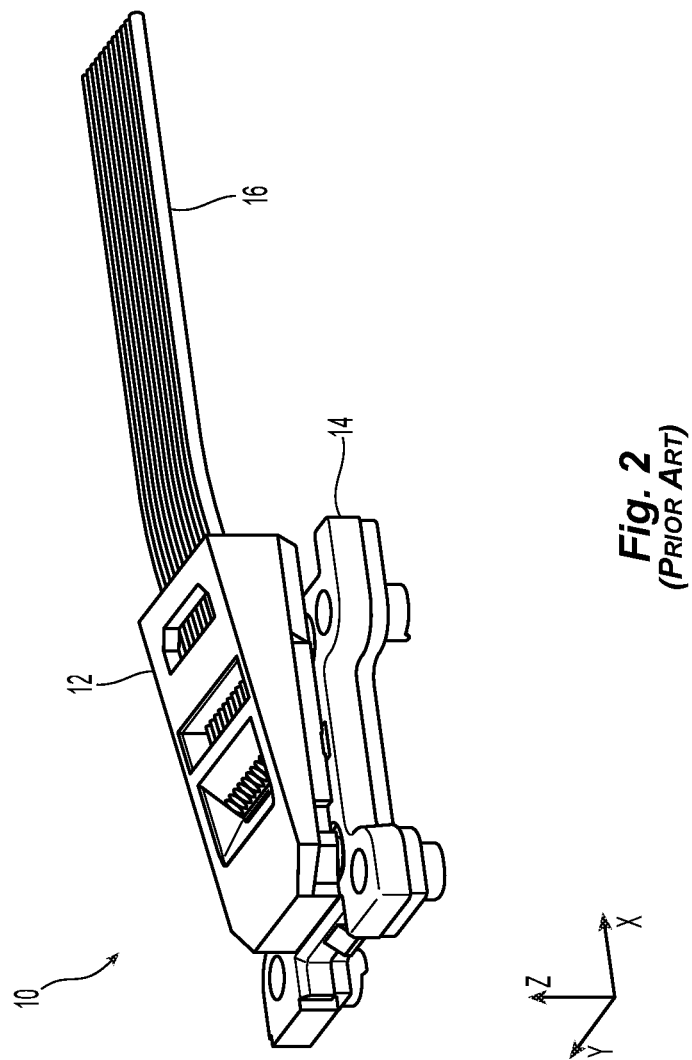
FIG. 2 is a perspective view of the mated fiber optic ferrule and optical transceiver component of FIG. 1.

Referring to FIGS. 1 and 2, one example of a prior art apparatus 10 for forming a transceiver interface includes a fiber optic ferrule 12 and an optical transceiver component 14, with optical fibers 16 fixed in the fiber optic ferrule 12. The fiber optic ferrule 12 has guide pins 18 and the optical transceiver component 14 has guide pin holes 20 to receive the guide pins 18. The guide pins 18 and the guide pin holes 20 control three of the six degrees of freedom: the location of the fiber optic ferrule 12 in the x and y directions and rotation in x/y plane. See FIG. 2. The fiber optic ferrule 12 and the optical transceiver component 14 also have mating planes 22,24, respectively. When the fiber optic ferrule 12 and the optical transceiver component 14 are engaged, as in FIG. 2, the mating planes 22,24 of the fiber optic ferrule 12 and an optical transceiver component 14, are in contact with one another. This contact aligns the fiber optic ferrule 12 to the optical transceiver component 14 in the z direction and the rotation in the y/z and the x/z planes.

Figure 3:
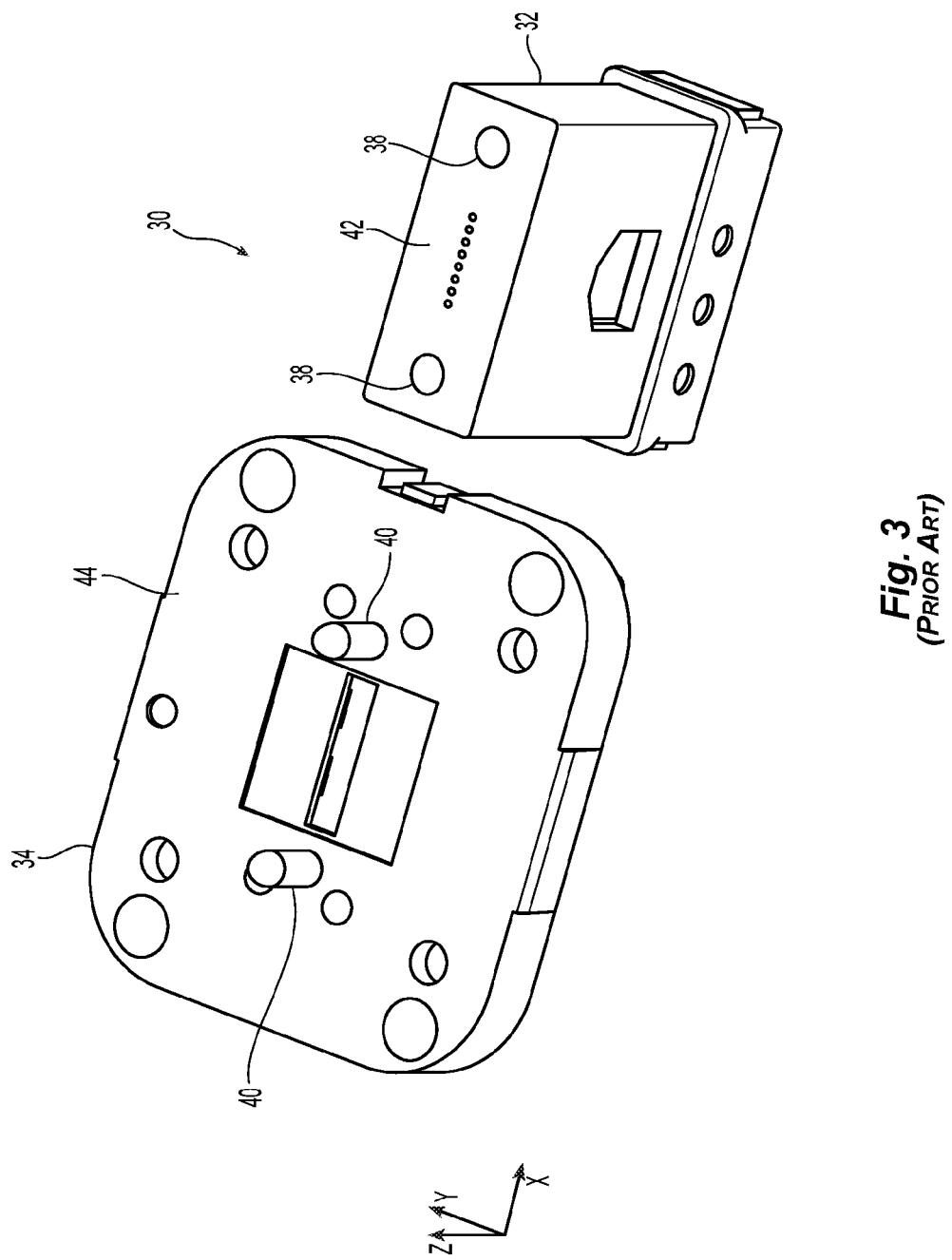
FIG. 3 is an exploded view of a second prior art fiber optic ferrule and optical transceiver component showing mating surfaces.
Figure 4:
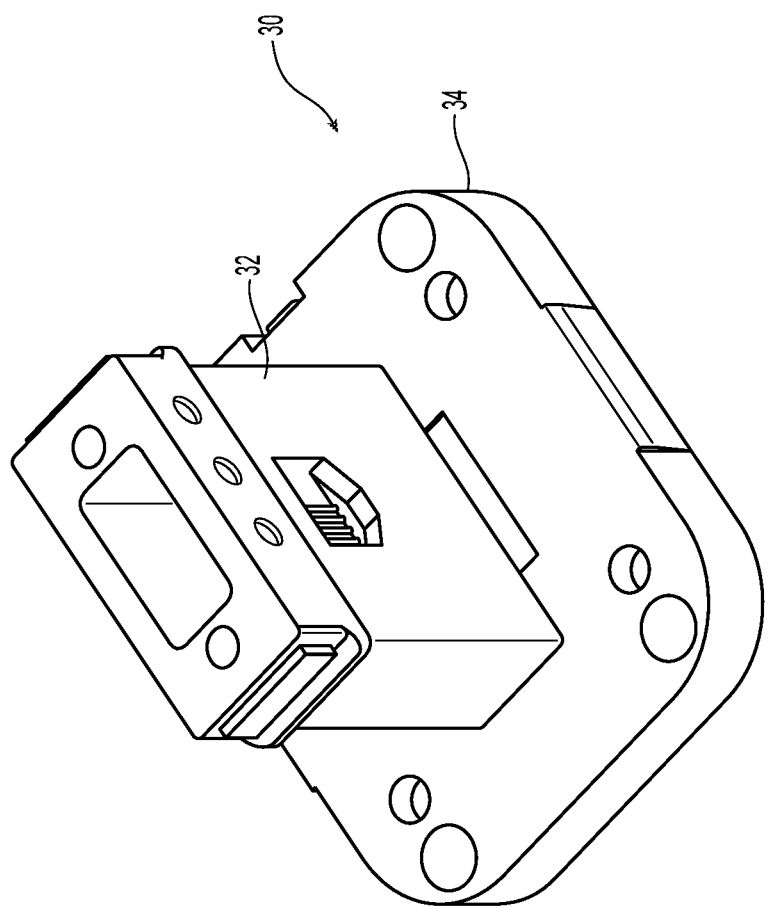
FIG. 4 is a perspective view of the mated fiber optic ferrule and optical transceiver component of FIG. 3.

The same is also true with the prior art apparatus 30 in FIGS. 3 and 4 for forming a transceiver interface that includes a fiber optic ferrule 32 and an optical transceiver component 34. Optical fibers, not shown, are fixed in the fiber optic ferrule 32 as is known in the art. The optical transceiver component 34 has guide pins 40 and fiber optic ferrule 32 has guide pin holes 38 to receive the guide pins 40. The guide pins 40 and the guide pin holes 38 control three of the six degrees of freedom: the location of the fiber optic ferrule 32 in the x and y directions and rotation in x/y plane. The fiber optic ferrule 32 and the optical transceiver component 34 also have mating planes 42,44, respectively. When the fiber optic ferrule 32 and the optical transceiver component 34 are engaged, as in FIG. 4, the mating planes 42,44 of the fiber optic ferrule 32 and an optical transceiver component 34, are in contact with one another. This contact aligns the fiber optic ferrule 32 to the optical transceiver component 34 in the z direction and the rotation in the y/z and the x/z planes.

Figure 5:
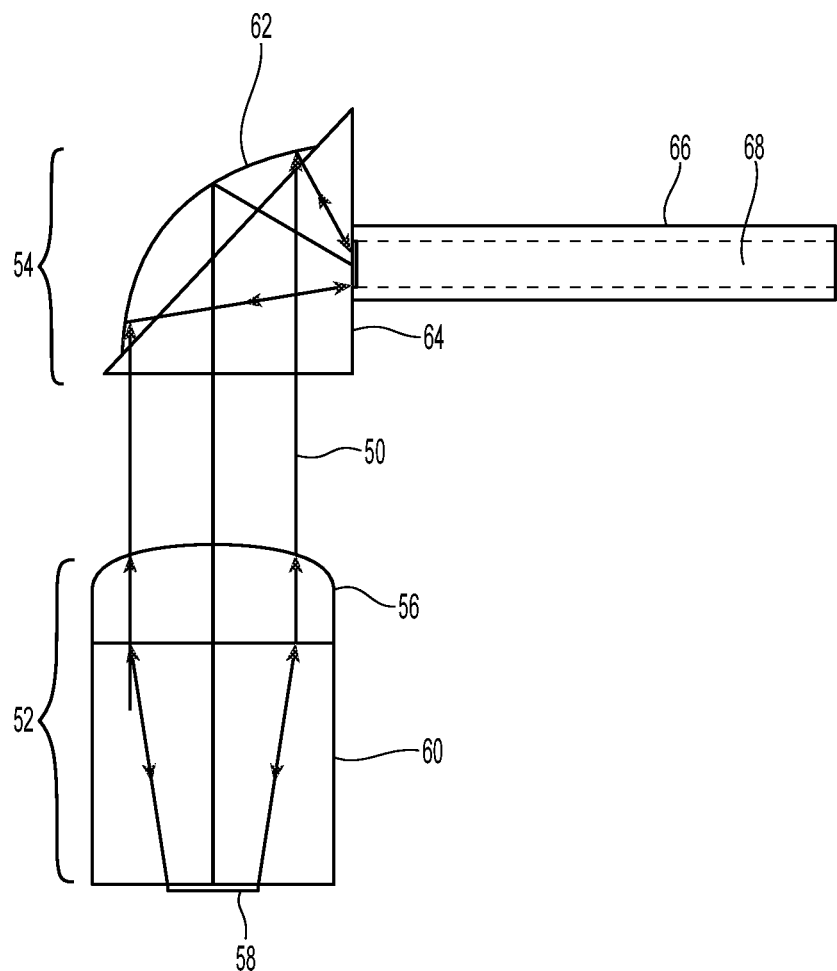
FIG. 5 is a schematic view of the optical geometry for a fiber optic ferrule and lenses in an optical transceiver component.

However, there is a need to couple optical silicon devices to single-mode optical fibers through the use of a fiber optic ferrule—generally contained within a fiber optic connector. In the schematic diagram of FIG. 5, one design possibility is to use an expanded, collimated beam 50 between the transceiver 52 and the fiber optic connector 54. The space between the transceiver 52 and the fiber optic connector 54 is an air gap. The transceiver 52 has a lens 56 made from silicon, glass, or other low CTE material disposed above a silicon photonics aperture 58, which is often a grating coupler with a 9 micron diameter. Between the silicon lens 56 and the silicon photonics aperture 58 is typically an air gap, glass, or more silicon 60. The fiber optic connector 54 includes a lens 62 (typically exposed to air for total internal reflection) on the fiber optic ferrule 64, and an optical fiber 66 in alignment with the lens 62, the optical fiber 66 having a fiber core 68. The typical diameter of the optical fiber core 68 is about 9 microns. The expanded, collimated light beam 50 loosens the lateral alignment tolerances in the x/y plane between the fiber optic connector 54 and the transceiver enabling a separable connection, i.e., the air gap. The diagram represents a cross section in the x/z plane. Since the beam 50 is expanded and collimated between the transceiver 52 and the fiber optic connector 54, the lateral tolerance (alignment in the x/y plane) between the transceiver 52 and the fiber optic connector 54 is approximately 10 microns (significantly relaxed). Although the lateral tolerances are loosened by using an expanded beam, the angular tolerances between the ferrule lens 62 and the transceiver lens 56 must be tightened. In this case the angular tolerance should be approximately 0.2 degrees or better. Due to this tightened angular requirement, it is desirable to mate the ferrule component directly to the lens component. Furthermore, in this example the required tolerance between the lens 56 and the silicon photonics aperture 58 is approximately 1.5 microns. However, the silicon lens 56 and the silicon photonics aperture 58 are manufactured in arrays to maintain a low cost and high bandwidth density. The grating coupler array is made from silicon or another material with a low CTE. In order to maintain this tolerance, the lens array also needs to be made of a low CTE material such as silicon or glass. However, it is difficult to make alignment holes or pins in a lens array with low CTE materials as was previously done in the prior art. Therefore, it is necessary to separate the design into two components—a low CTE lens array and another component associated with the transceiver 52 that aligns the connector using guide pins or holes.

Figure 6:
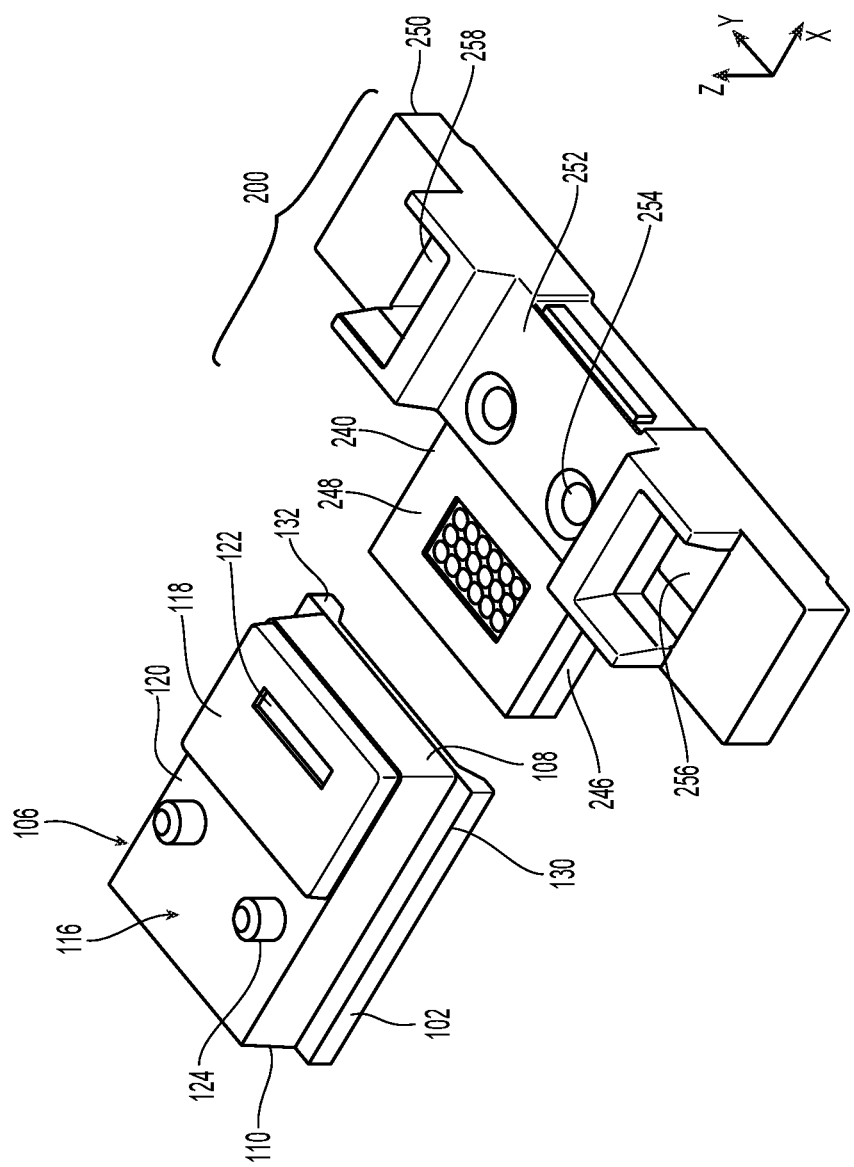
FIG. 6 is an exploded view of one embodiment of a fiber optic ferrule and optical transceiver component according to the present invention showing mating surfaces.
Figure 7:
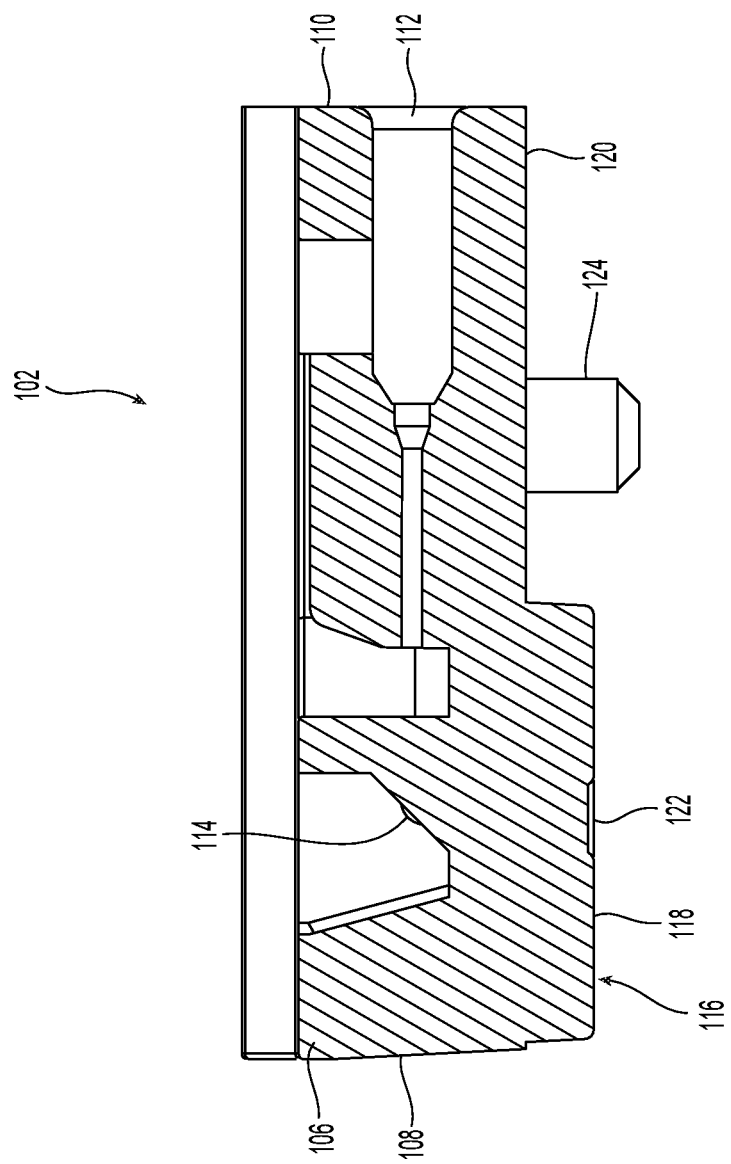
FIG. 7 is a cross-sectional view of the fiber optic ferrule of FIG. 6.

One such embodiment of an fiber optic connector assembly 100, which includes a fiber optic ferrule 102 and a connector 104, is illustrated in FIGS. 7-16. As noted above the fiber optic ferrule 102 engages and is in optical communication with an optical transceiver component 200. FIG. 6 illustrates the mating surfaces of a fiber optic ferrule 102 with an optical transceiver component 200. The optical transceiver component 200 may be mounted or disposed in any number of substrates 202, which may include a transceiver lid, a circuit board, etc. See FIG. 8. Additional details of the optical transceiver component 200 are described below.

The fiber optic ferrule 102 includes a main body 106, the main body 106 having a front end 108, a back end 110, and a first opening 112 (see FIG. 7) extending from the back end 110 toward the front end 108. The first opening 112 is configured to receive optical fibers 128 to align with lenses 114. The fiber optic ferrule 102 also has a bottom surface 116 having a first portion 118 and a second portion 120, the first portion 118 having an optical aperture 122 therein to allow light associated with the optical fibers to pass through the fiber optic ferrule 102. The second portion 120 has alignment projections 124 (guide pins are illustrated herein) extending from the bottom surface 116 and away from the main body 106. The fiber optic ferrule 102 also has laterally extending projections (an elongated shoulder as illustrated in FIG. 6 or a generally cylindrical extension in FIG. 17) 130,132 on either side of the main body 106 (see FIG. 6) to engage the connector 104, as described in more detail below. The laterally elongated projections 130,132 are illustrated as extending along a substantial portion of the length of the fiber optic ferrule 102, but they could be shorter, thicker, or even have multiple thicknesses and still fall within the scope of the present invention.

Cooperating with the fiber optic ferrule 102 is optical transceiver component 200. See FIG. 6. The optical transceiver component 200 includes a lens array 240 with a plurality of optical lenses 242. The lens array 240 shows 18 lenses (3 rows of 6), but there could be more or fewer, depending on the number of optical fibers in the fiber optic ferrule 102 or the desire of the user. The lens array 240 is preferably etched from silicon or another low CTE material. The lens array 240 is preferably aligned to transceiver apertures (not shown) as known to those of skill in the art.

The optical transceiver component 200 also includes a mechanical interface 250 that has a joining surface 252 aligned with the lens array 240. The joining surface 252 has two openings 254 that are sized to receive the alignment projections 124 therein. Preferably, the openings 254 are slightly larger than the alignment projections 124, to allow some movement of the alignment projections 124 for the reasons discussed below.

The combination of the alignment projections 124 and the openings 254 provide control of three of the degrees of freedom—the alignment in the x and the y planes and also the rotation in the x/y plane. Since the mechanical interface 250 has been aligned with the lens array 240, then the fiber optic ferrule 102 mating to the mechanical interface 250 accounts for these three degrees of freedom. To account for the other three degrees of freedom (z alignment, and rotation in y/z and x/z planes), the bottom surface 116 of the fiber optic ferrule 102 makes contact with the mating surface 248 of the lens array 240. Since both the bottom surface 116, particularly the first portion 118, and the mating surface 248 of the lens array 240 are flat, the z alignment, and rotation in y/z and x/z planes are accounted for. These two surfaces, first portion 118 and the mating surface 248 of the lens array 240, are therefore mating surfaces in that they engage one another across the majority of the surface. In order to ensure that the bottom surface 116 and the mating surface 248 of the lens array 240 are able to make contact with one another (besides ensuring that they are both flat), the bottom surface 116, and particularly the second portion 120, cannot make contact with the joining surface 252 of the mechanical interface 250. The engagement of the fiber optic ferrule 102 and the mating surface 248 are further described in co-pending application Ser. No. 14/950,277, entitled Apparatus for Forming a Transceiver Interface, Ferrule and Optical Transceiver Component, filed on Nov. 24, 2015, the contents of which are incorporated herein by reference.

Figure 8:
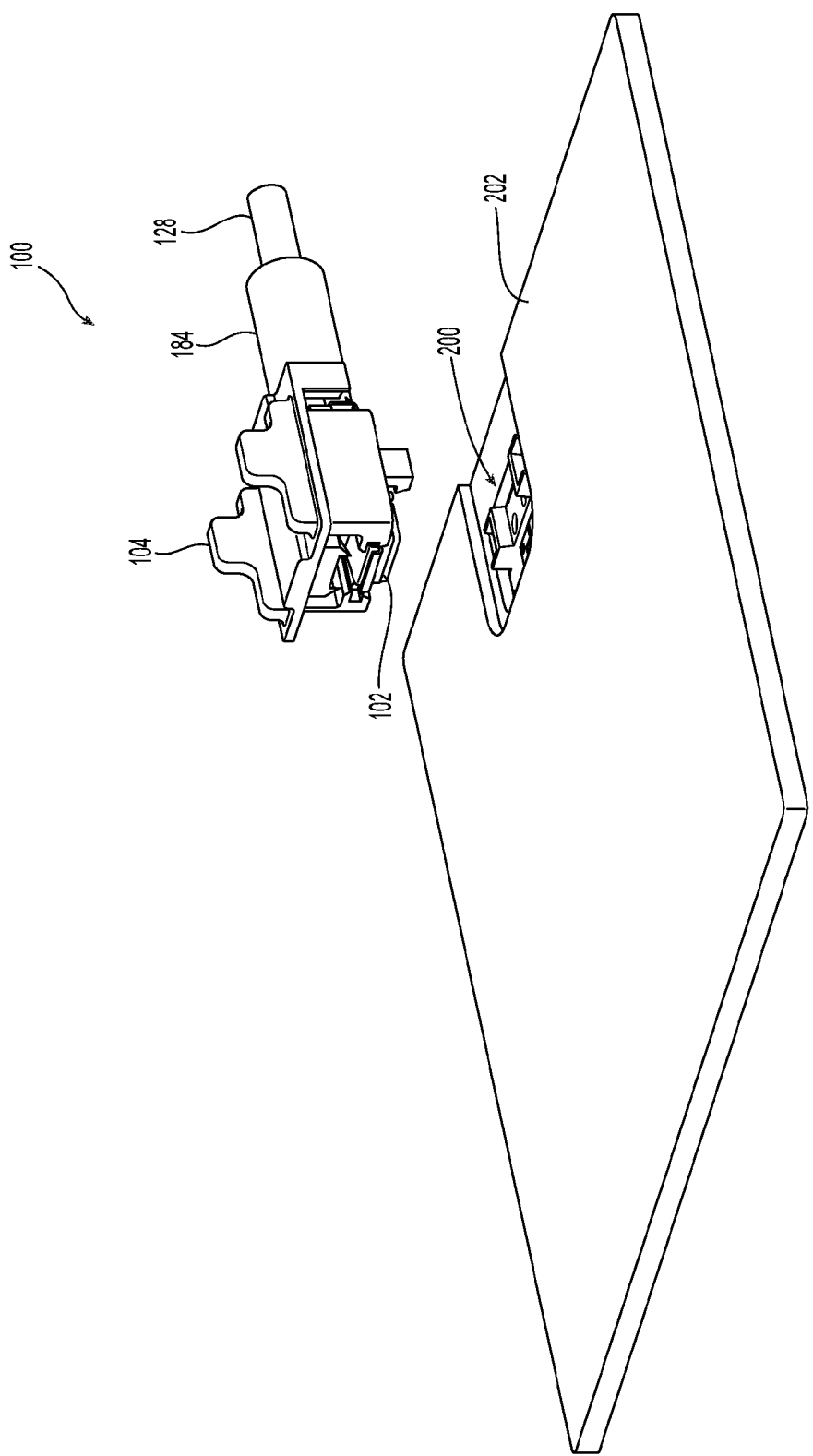
FIG. 8 is a perspective view of one embodiment of a fiber optic ferrule and connector assembly according to the present invention adjacent an optical transceiver component.
Figure 9:
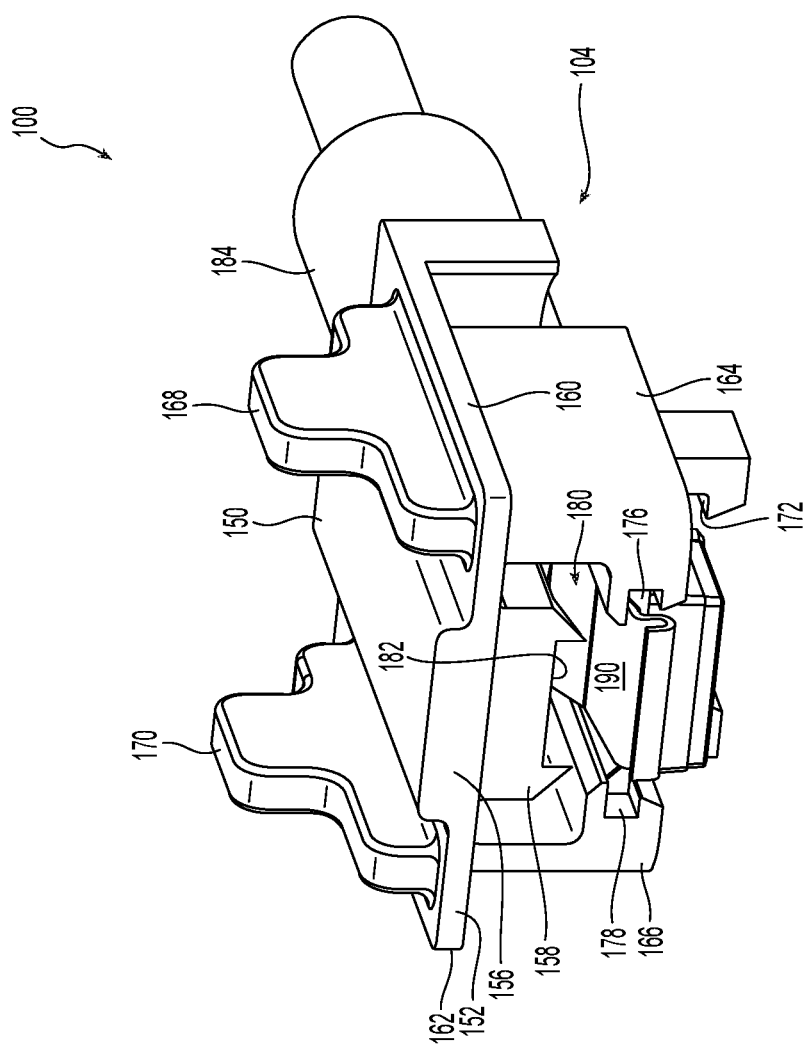
FIG. 9 is a perspective view of the fiber optic ferrule and connector assembly of FIG. 6 prior to mating with the optical transceiver.
Figure 10:
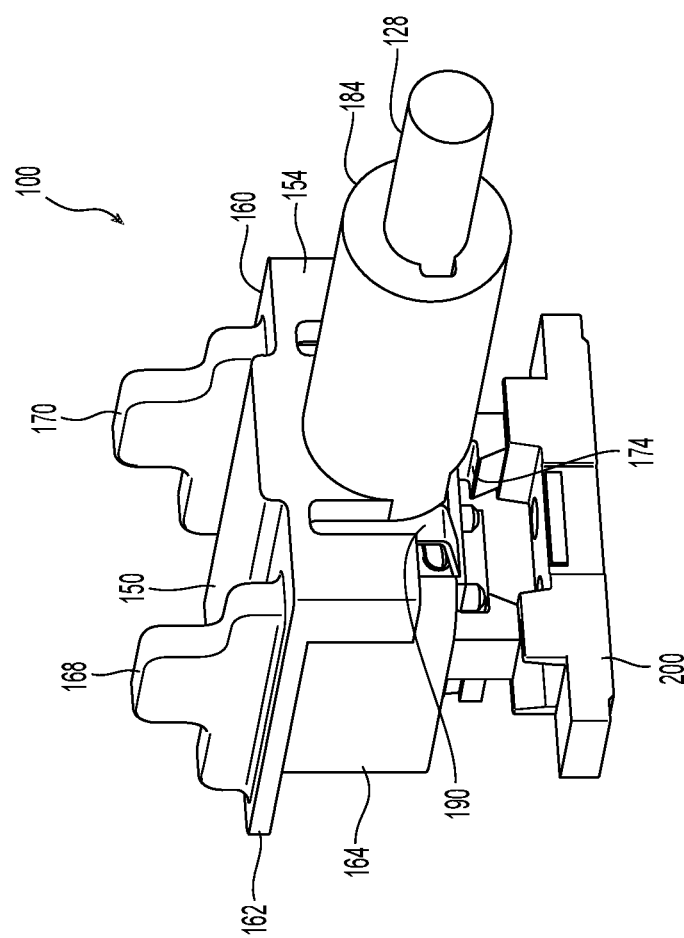
FIG. 10 is a rear view of the fiber optic ferrule and connector assembly prior to engagement of the connector with the optical transceiver.
Figure 11:
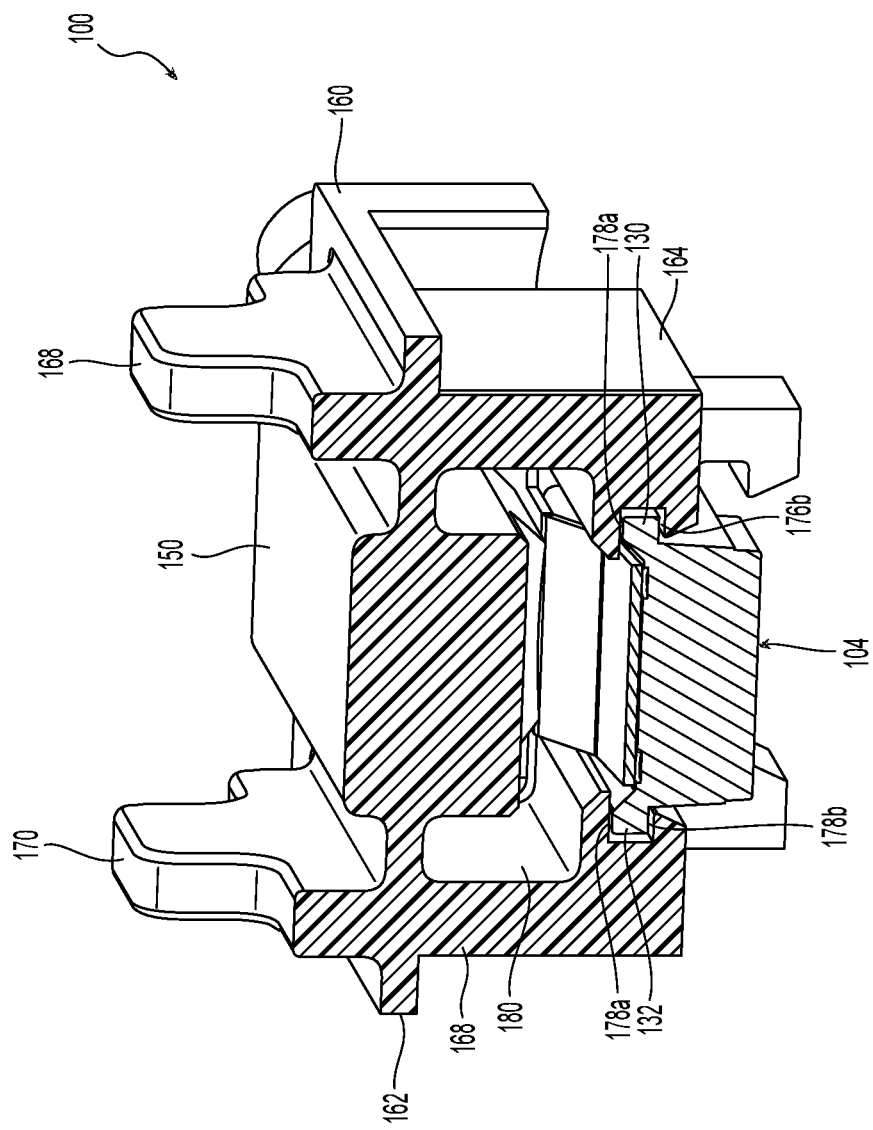
FIG. 11 is a cross sectional view of the fiber optic ferrule and connector assembly of FIG. 9.
Figure 12:
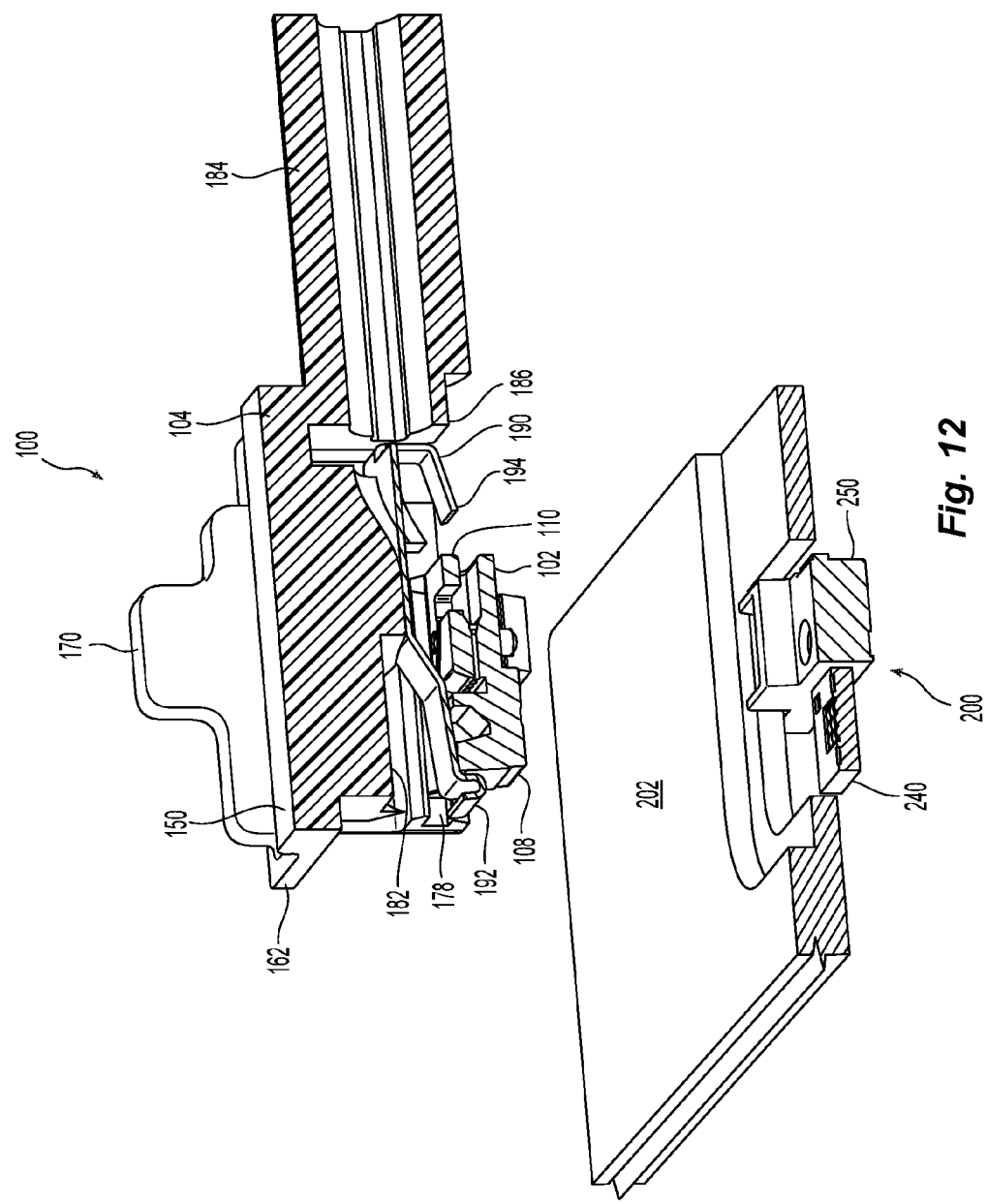
FIG. 12 is cross sectional view of the fiber optic ferrule and connector assembly of FIG. 9 adjacent the optical transceiver component.
Figure 13:
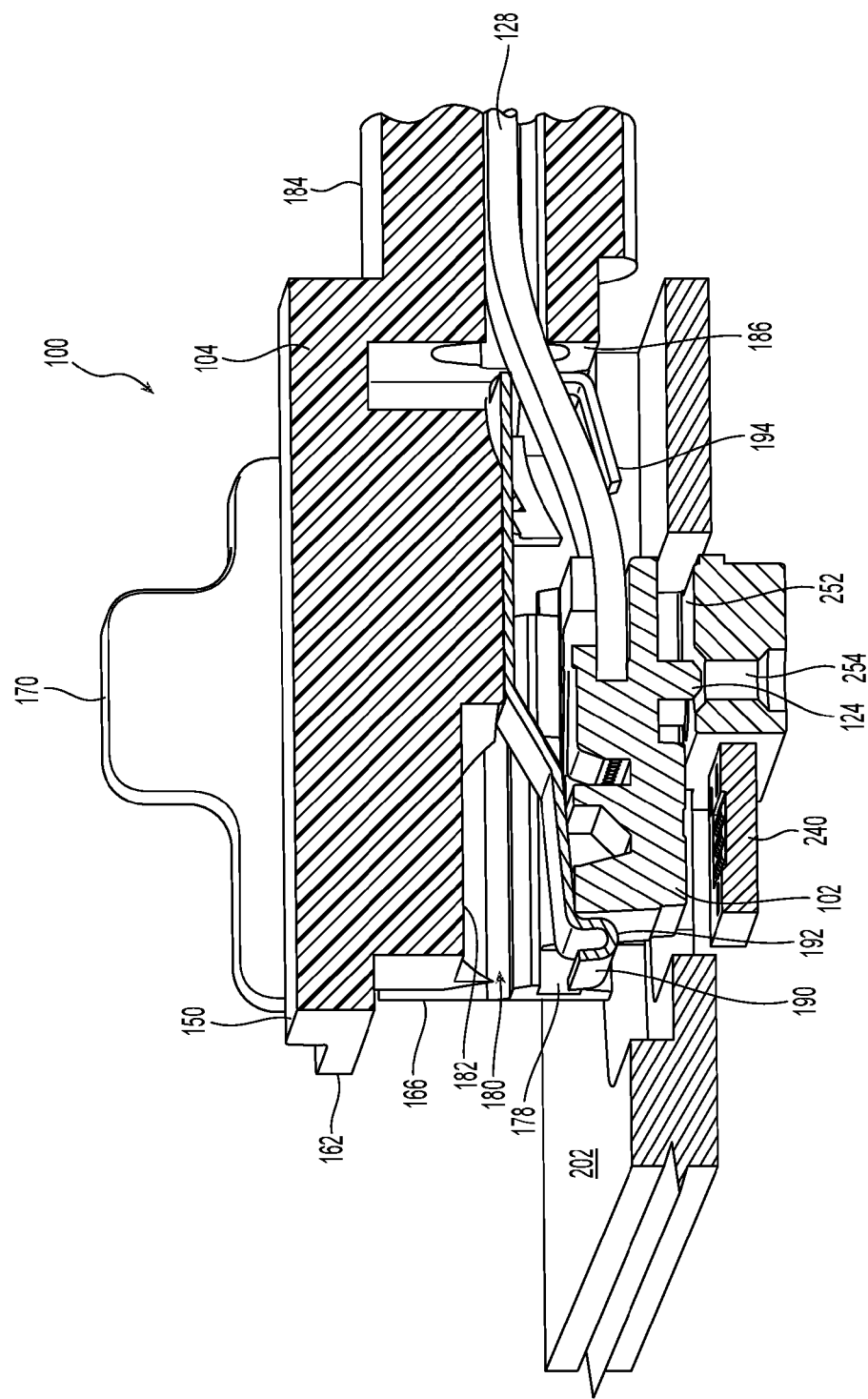
FIG. 13 is a cross-sectional view of the fiber optic ferrule and connector assembly as the guide pins enter the guide pin holes.
Figure 14:
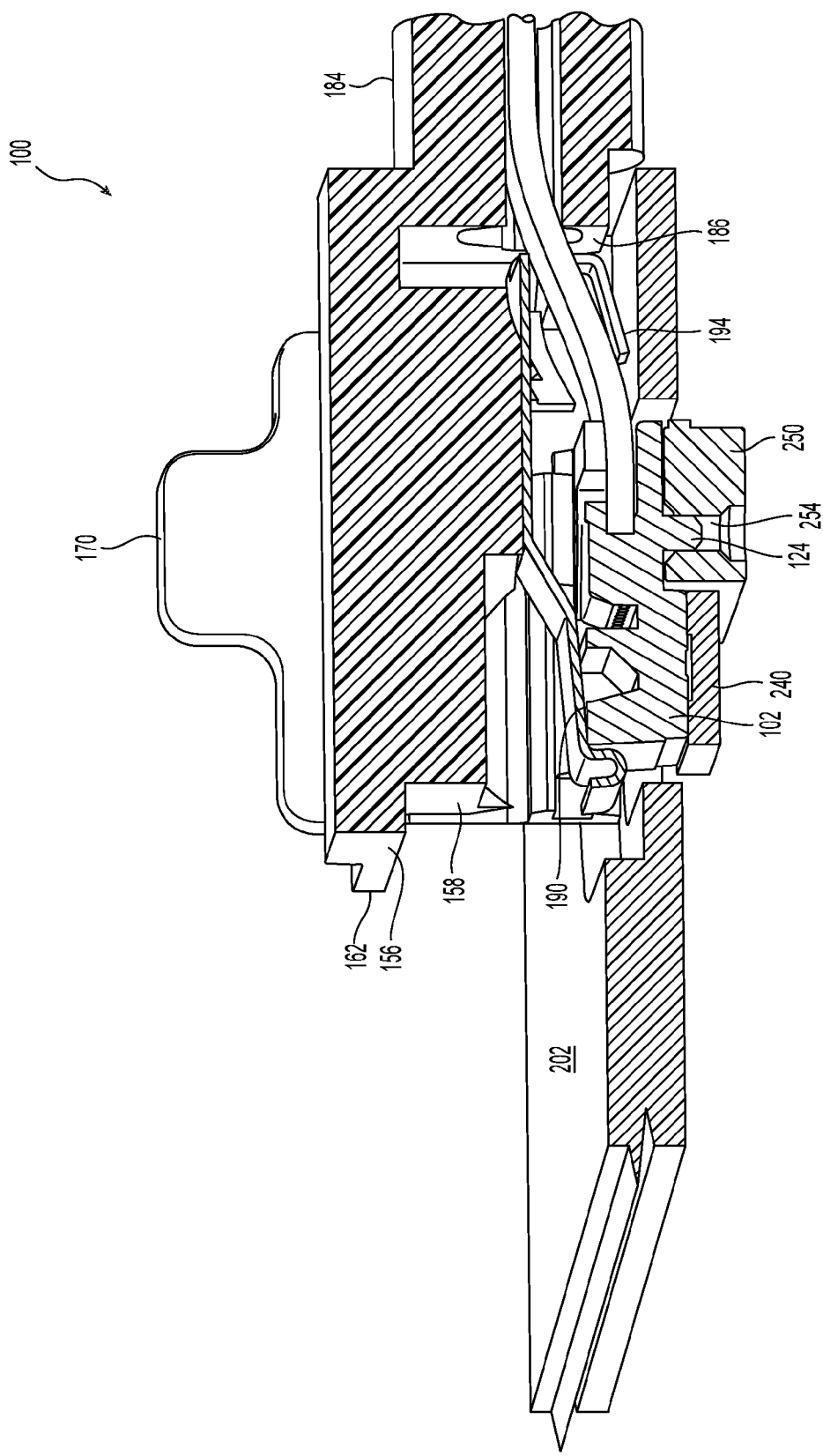
FIG. 14 is a cross sectional view of the fiber optic ferrule and connector assembly as the elastic element engages the optical transceiver.
Figure 15:
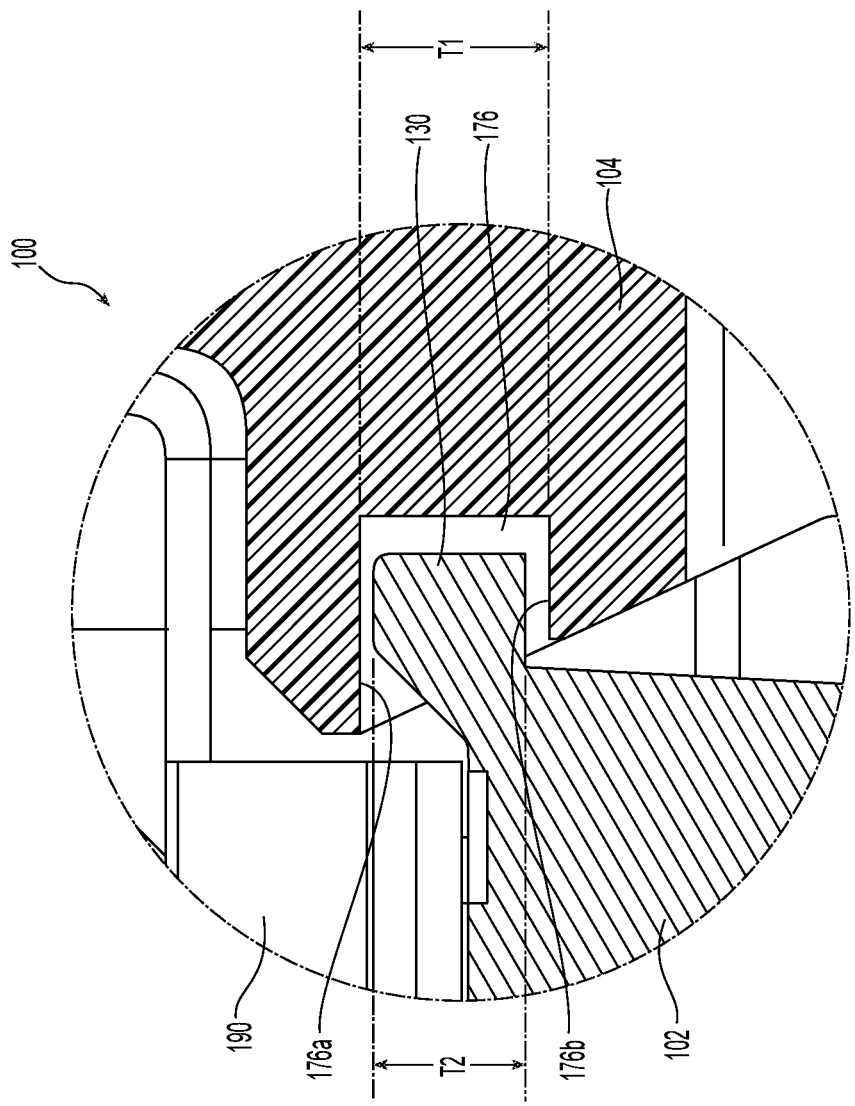
FIG. 15 is a detailed cross-sectional view of the fiber optic ferrule and connector assembly after the connector has been latched to the optical transceiver showing the groove.
Figure 16:
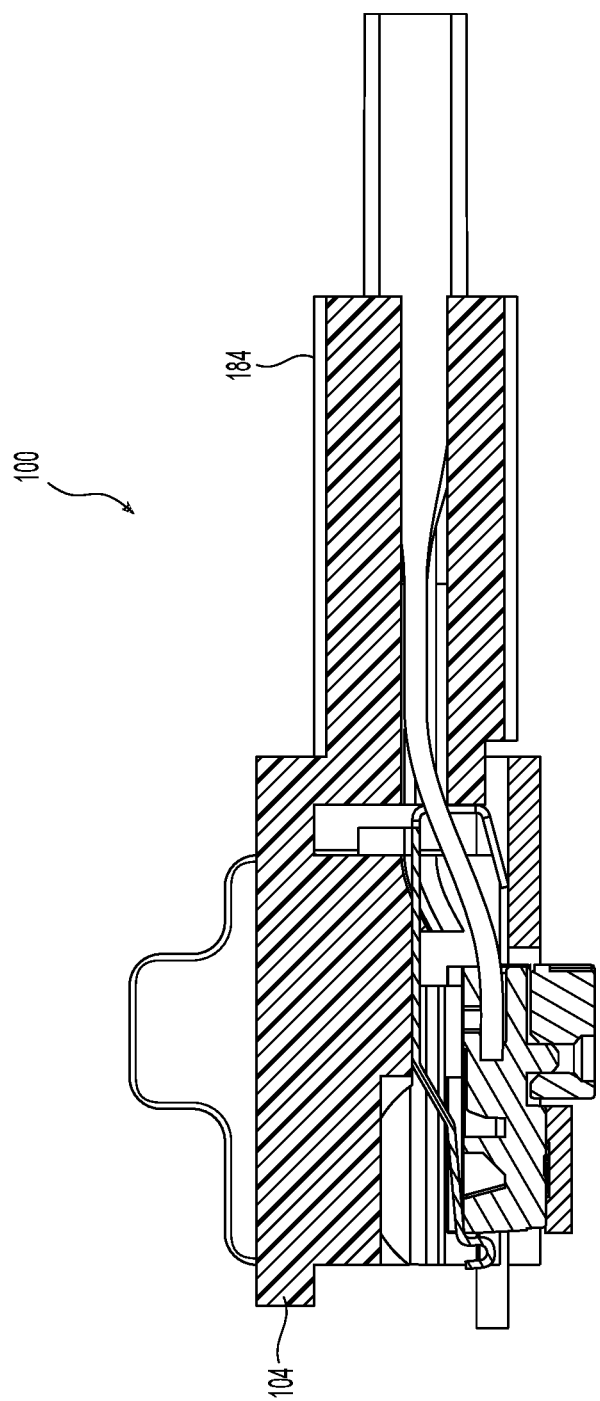
FIG. 16 is a cross-sectional view of the fiber optic ferrule and connector assembly fully engaged with the optical transceiver.

To connect the fiber optic ferrule 102 with the optical transceiver component 200, a connector can be used to removably attach the fiber optic ferrule 102 to the optical transceiver component 200. By "removably attach," Applicant means that the two components can be attached and removed from one another repeatedly without damaging either of the components or forcing the removal of one of the components from the other. One embodiment of a connector 104, which can be used to connect fiber-optic ferrule 102 to optical transceiver component 200, is illustrated in FIG. 8. The connector 104 has a main body 150 extending from a front end 152 to a back end 154. The main body 150 has an upper portion 156 and a lower portion 158 with two laterally extending portions 160 and 162, which essentially divide the main body 150 into the upper and lower portions 156,158. The front face 160 of the lower portion 158 is illustrated as being recessed relative to the front end 152 of the upper portion 156. However, they may be flush or even inverted and come within the scope of the present invention. It should be noted that main body 150 is formed all at the same time in a single mold from the same material. The reference to the upper portion 156 and the lower portion 158 is merely to distinguish the recessed portion and does not indicate that they are two separate pieces. However, the main body 150 could be made from more than one piece.

Extending downward from the laterally extending portions 160, 162 are latches 164, 166. Extending upward from the laterally extending portions 160,162 are tabs 168, 170 that are used to release the latches 164,166, by squeezing the tabs 168, 170 toward one another. At the end of the latches 164, 166 are upward facing surfaces, 172, 174, respectively. The upward facing surfaces, 172,174, engage corresponding surfaces in openings 256,258 of the optical transceiver component 200 to maintain the fiber optic connector assembly 100 and the optical transceiver component 200 in a fixed relationship to one another. The laterally extending portions or shoulders 160,162 are dimensioned so as to flex when the tabs 168, 170 are squeezed (or when the latches 164, 166 are inserted into the openings 256, 258) to allow an appropriate amount of lateral movement of the distal ends of the latches 164, 166. The function of the tabs 168,170 with the latches 164,166 will be further clarified in the discussion provided below.

The latches 164,166 also include two receptacles 176, 178 (illustrated in this embodiment as grooves but could be other structures, as noted below in relation to an alternative embodiment in FIG. 17) that receive the laterally extending projections or shoulders 130,132 on the fiber optic ferrule 102. The fiber optic ferrule 102 is disposed within an opening 180 within the connector 104. The opening 180 is formed by a bottom surface 182 of the lower portion 158 of the main body 150 and the two latches 164,166. The opening 180 extends rearwardly toward the back end 154. Attached at the back end 154 is a cylindrical optical fiber housing 184, through which the optical fibers 128 (the optical fibers may be in a matrix covering, a cable jacket, or other covering and still fall within the scope of the present invention). The cylindrical optical fiber housing 184 is preferably formed at the same time as the remainder of the connector 104. As recognized by those of skill in the art, the connector 104 would have the un-terminated optical fibers 128 inserted through the cylindrical optical fiber housing 184, and the opening 180 in the connector 104, where the fiber optic ferrule 102 would then be secured to the optical fibers 128. The fiber optic ferrule 102 (in particular the laterally extending projections or shoulders 130,132) would then be inserted into the two grooves 176, 178. The grooves 176, 178 have an upper surface 176a, 178a and a lower surface 176b, 178b, separated by a distance T1 of 0.5 to 1.0 mm. The shoulders have a thickness T2 of 0.3 to 0.4 mm. A boot or other protection (not shown) can also be used to cover the optical fibers 128 and the cylindrical optical fiber housing 184, but is not required.

It should be noted that the grooves 176, 178 are deep enough (the width of the upper surfaces 176a, 178a and lower surfaces 176b, 178b) that the fiber optic ferrule 102 does not fall from latches 164, 166, when squeezing the tabs 168, 170 or separating the latches 164, 166 when inserting the connector 104 into the optical transceiver component 200. Alternatively, it is possible that another structure extend from the bottom surface 182 of the lower portion 158 of the main body 150 down in a parallel manner to the latches 164, 166 with other grooves to support the fiber optic ferrule 102 so that the alternative structure does not move when the tabs 168, 170 are squeezed to engage and/or disengage the connector 104 from the optical transceiver component 200.

Figure 18:
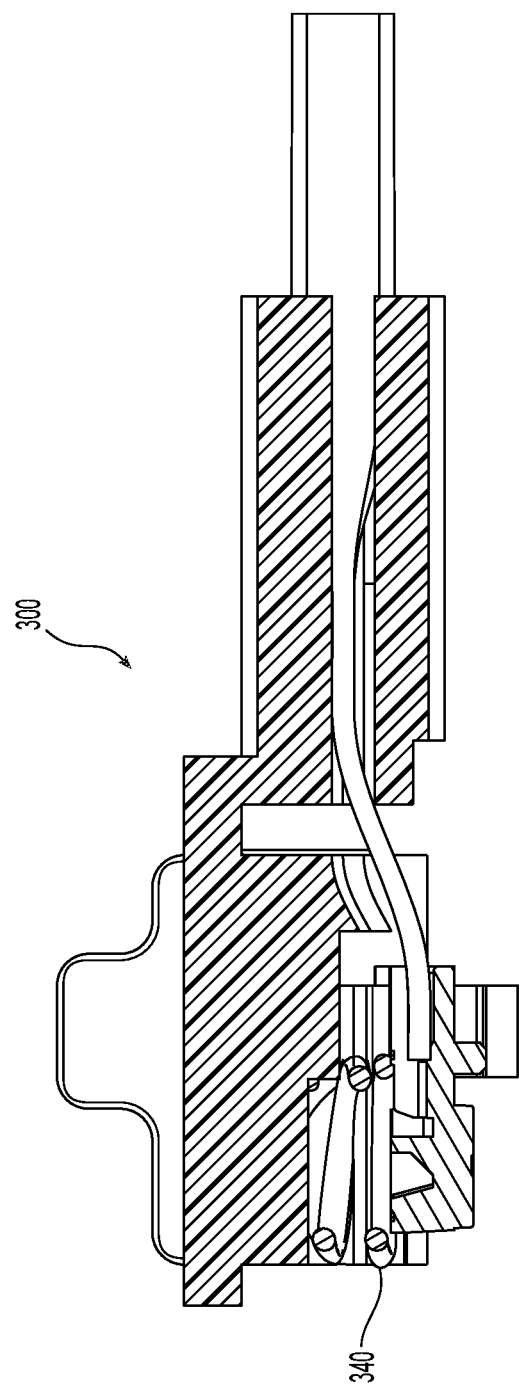
FIG. 18 is a cross-sectional view of another embodiment of a fiber optic ferrule and connector assembly according to the present invention.

Disposed between the fiber optic ferrule 102 and the connector 104 is an elastic member 190. See FIG. 12 (the optical fibers 128 have been removed for clarity purposes). The elastic member 190 is preferably a leaf spring, but can also be a coil spring as illustrated in FIG. 18. The elastic member 190 has a first end 192 disposed over the front end 108 of the main body 106 of the fiber optic ferrule 102 and extends rearwardly past the back end 110 to the front end 186 of the cylindrical optical fiber housing 184, where the elastic member 190 extends downward before returning in a forward direction at an angle to a second end 194. The first end 192 of elastic member 190 extends along a top surface of the fiber optic ferrule 102 corresponding to the first portion 118. The elastic member 190 then extends upward to engage the bottom surface 182 of the main body 150 in the opening 180. This arrangement causes the fiber optic ferrule 102 to be biased downward (away from the bottom surface 182 of the opening 180) and the laterally extending projections (shoulders) 130,132 downward in the grooves 176, 178. Thus, the elastic member 190, when pushing on the fiber optic ferrule 102, pushes the laterally extending projections/shoulders 130,132 downward onto the lower surfaces 176b,178b when the fiber optic connector assembly 100 is not engaged to the optical transceiver component 200.

The attachment of the fiber optic connector assembly 100 to the optical transceiver component 200 will now be described with reference to FIGS. 10 and 13-16. As the fiber optic connector assembly 100 is aligned with the optical transceiver component 200, the latches 164, 166 are aligned with the openings 256, 258. See, e.g., FIG. 10. As the latches 164, 166 are entering the openings 256,258, the alignment projections 124 on the fiber optic ferrule 102 are being roughly aligned with the two openings 254 in the optical transceiver component 200. See FIG. 13. Once the alignment projections 124 enter the openings 254, the first portion 118 aligns with the mating surface 248 of the lens array 240. See FIG. 14. As of the connector 104 is secured to the mechanical interface 250, the fiber-optic ferrule 102 engages the mating surfaced 248 and, due to the relative positions of the fiber optic ferrule 102, the connector 104, and the optical transceiver component 200, the fiber-optic ferrule 102 is pushed upwards relative to the connector 104. As such, the laterally extending projections/shoulders 130, 132 would be biased upward off of the lower surfaces 176b, 178b of the grooves 176, 178. See FIG. 16. However, the laterally extending projections/shoulders 130, 132 would not be engaging the upper surfaces 176a,178a of the grooves 176,178. Thus, the fiber optic ferrule 102 is floating relative to the connector 104, with the exception of the engagement of the elastic member 190. It should be noted that the second end 194 of the elastic member 190 engages a portion of the optical transceiver component 200 or one of the substrates 202 in which it is mounted. See FIG. 14. A vertical force is applied to the second end 194 of the elastic number 190, causing a vertical force from the elastic member 190 to be applied to the top of the fiber optic ferrule 102 over the first portion 118. As with the prior application, the second portion 120 does not engage the joining surface 252 of the mechanical interface 250 thereby allowing a complete mating of the first portion 118 with the meeting service 248 with all six degrees of freedom being controlled.

Figure 17:
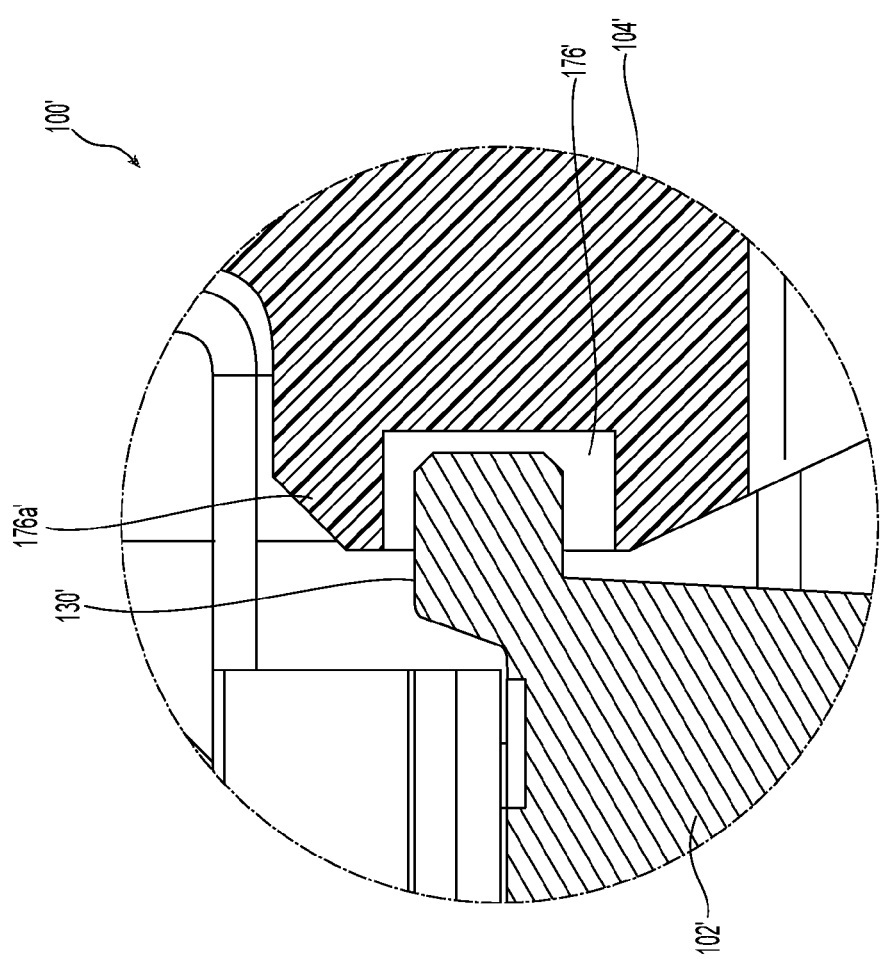
FIG. 17 is a detailed cross-sectional view of an another embodiment of fiber optic ferrule and connector assembly according to the present invention.

An alternative embodiment of a fiber optic connector assembly 100' is partially illustrated in FIG. 17. In this embodiment, the fiber optic ferrule 102' has alternative laterally extending projections, with a laterally extending projection 130' illustrated in FIG. 17 (the corresponding projection 132' on the opposite side is not visible in this figure). Similarly, the connector 104' has alternative receptacles, again with only one receptacle 176' visible while the corresponding receptacle is on the other side of the connector 104'. In this embodiment, the laterally extending projections 130',132' are laterally extending generally cylindrical projections and the receptacles 176',178' are depressions to receive the laterally extending projections 130',132'. The depressions 176',178' are generally oval in shape with the longer axis in a vertical orientation, which allow the fiber optic ferrule 102' to float vertically with respect to the connector 104' as described above with the other embodiments. While there is a shoulder 176a' that surrounds the depression, it is possible that the latches are thick enough to allow material to be removed therefrom to create the oval receptacles. In this embodiment, the fiber optic ferrule 102' could be snapped into the depressions 176',178' rather than sliding into grooves.

As noted above, the present invention also contemplates that a coiled spring can be used rather than a leaf spring. A fiber optic connector assembly 300 is illustrated in FIG. 18 that replaces elastic member (the leaf spring) 190 with a coil spring 390.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:
1. An fiber optic connector assembly comprising:
   a fiber optic ferrule comprising:
      a main body having a front end, a back end, and a first opening extending from the back end toward the front end, the first opening configured to receive optical fibers therein; and
      a bottom surface having a first portion and a second portion, the first portion having an optical aperture therein to allow light associated with the optical fibers to pass therethrough and the second portion having alignment projections extending from the bottom surface and away from the main body; and
   a connector to receive the fiber optic ferrule therein, the connector having a front end and a back end and an opening therebetween to receive the fiber optic ferrule therein, two latches on opposite sides of the opening between the front and back end and extending below the opening to engage a transceiver component, each of the latches has a groove as a receptacle to receive an elongated shoulder of the fiber optic ferrule therein.

2. The apparatus according to claim 1, wherein the latches provide a latching mechanism to attach the connector to a portion of an optical component.

3. The apparatus according to claim 1, wherein the first and second portions of the fiber optic ferrule do not engage the connector when the connector is attached to an optical component.

4. An fiber optic connector assembly comprising:
a fiber optic ferrule comprising:
   a main body having a front end, a back end, and a first opening extending from the back end toward the front end, the first opening configured to receive optical fibers therein; and
   a bottom surface having a first portion and a second portion, the first portion having an optical aperture therein to allow light associated with the optical fibers to pass therethrough and the second portion having alignment projections extending from the bottom surface and away from the main body; and
a connector to receive the fiber optic ferrule therein, the connector having a front end and a back end and an opening therebetween to receive the fiber optic ferrule therein, two latches on opposite sides of the opening between the front and back end and extending below the opening to engage a transceiver component, each of the latches has a depression as a receptacle to receive a generally cylindrical extension of the fiber optic ferrule therein.

5. An fiber optic connector assembly comprising:
a fiber optic ferrule comprising:
   a main body having a front end, a back end, and a first opening extending from the back end toward the front end, the first opening configured to receive optical fibers therein; and
   a bottom surface having a first portion and a second portion, the first portion having an optical aperture therein to allow light associated with the optical fibers to pass therethrough and the second portion having alignment projections extending from the bottom surface and away from the main body;
a connector to receive the fiber optic ferrule therein, the connector having a front end and a back end and an opening therebetween to receive the fiber optic ferrule therein, two latches on opposite sides of the opening between the front and back end and extending below the opening to engage a transceiver component; and
an elastic element disposed between a top surface of the fiber optic ferrule and the connector, the elastic element biasing the fiber optic ferrule in a downward direction.

6. The apparatus according to claim 5, wherein the elastic element is a leaf spring.

7. The apparatus according to claim 6, wherein the elastic element extends over the top of the fiber optic ferrule from the front end of the main body past the back end and downward past the first opening.

8. The apparatus according to claim 5, wherein the elastic element is a coil spring.

9. The apparatus according to claim 5, wherein the elastic element biases the fiber optic ferrule at the first portion.

\* \* \* \* \*